3,172,772
METHOD FOR IMPROVING THE GLOSS PROPERTIES OF TITANIUM DIOXIDE PIGMENTS
Lancelot W. Rowe, Fords, N.J., assignor to National Lead Company, New York, N.Y., a corporation of New Jersey
No Drawing. Filed Dec. 30, 1960, Ser. No. 79,577
7 Claims. (Cl. 106—300)

This invention relates in general to the manufacture of titanium dioxide pigments. More specifically it relates to the process for improving the properties of titanium dioxide pigments particularly with respect to gloss.

Many well known methods are used for making titanium dioxide pigments in which a titanium hydrate is produced by the hydrolysis of a titanium sulfate solution followed by washing, bleaching and calcination to produce a calcined titanium dioxide pigment. This calcined material is then subjected to a wet milling treatment wherein it is finely ground and dispersed, after which it is treated with a metal hydrous oxide and subsequently dried and milled to produce a finely divided pigment material possessing high hiding power or tinting strength.

The calcined and wet milled titanium dioxide pigment may be treated with a variety of metal hydrous oxide agents. One particular method for treating the calcined titanium dioxide pigment which has been used successfully on a commercial scale is described as follows:

The calcined titanium dioxide pigment is subjected to a ball milling operation to reduce the agglomeration of the calcined materials. In this ball milling operation a dispersing agent, such as an alkali metal phosphate or silicate or other dispersants, well known to the art, is employed. The ball milled discharge is then classified to remove the coarse particles and to the fine fraction is added one or more salts of aluminum, titanium, silicon, zirconium and mixtures thereof. These salts are then converted and precipitated as hydrous oxides by the addition of reagents to form such oxides. If desirable, a flocculation agent such as $MgSO_4$ may be added to the tank prior to, or after the addition of the metal salts. The coated titanium dioxide pigment is washed to remove any soluble salts. Upon drying and milling the metal hydrous oxide coated titanium dioxide pigment has a high hiding power and good dispersion and develops a relatively high level of gloss in a paint enamel. Although titanium dioxide pigments in general have high gloss properties, it would be of great value to produce pigments having still higher gloss values.

An object of this instant invention, therefore, is to prepare titanium dioxide pigments which have higher gloss values than those previously produced. A still further object is to produce titanium dioxide pigments which possess higher gloss values by a process which is simple and economical to employ. These and other objects will become more apparent from the following more complete description of the instant inventions.

Broadly, the instant invention contemplates a process for producing a titanium dioxide pigment having improved gloss characteristics which comprises adding, to a wet milled, metal hydrous oxide treated titanium dioxide pigment, from 0.1% to 2.0% of an acid selected from the group consisting of benzoic acid and para-aminobenzoic acid and from 0.1% to 2.0% of an amine selected from the group consisting of benzylamine, ethanolamine, diethanolamine, triethanolamine, dipropylamine, monoisopropanolamine, ethylenediamine and cyclohexylamine, the percentages being weight percentages based on the weight of the titanium dioxide being treated, and without removing said acid and said amine, milling said pigment.

The process of the instant invention is simple to employ. The organic acid and the amine are merely added to the metal hydrous oxide treated titanium dioxide pigment and, without removing these agents from the pigment, the pigment is then milled to produce a finely divided high tinting strength pigment having greatly improved gloss characteristics.

The acid and amine treating agents may be added to the pigment in any manner. It has been found convenient, although not necessary, to add the organic acid and the amine to a small amount of an organic solvent, such as acetone, and add this mixture to the pigment just prior to grinding.

The amounts of treating agents used for both the organic acid and the amine should lie within the range of from 0.1% to 2.0% for each agent based on the weight of the titanium dioxide being treated. Below 0.1% the increase in gloss is insufficient to warrant its use, while above 2.0% the results do not indicate an advantage of using amounts above those which lie within the specified range. The preferred amounts are from 0.3% to 1.0%. It is desirable to add the organic acid and the amine in amounts to produce substantially a neutral pigment (i.e. from pH of 6.0 to 8.0), after the treating agents have been added.

Since the instant invention is primarily concerned with improving the gloss properties of the titanium dioxide pigment, the following test was used to obtain the gloss data.

A standard baked enamel film of $TiO_2$ pigment (20% by volume), a binder of urea-formaldehyde (20%) and an alkyd vehicle (80%) was prepared as follows:

65 grams of the $TiO_2$ pigment were mixed with 35 grams of a urea-formaldehyde resin. The mixture was passed through a three-roller mill. 77 grams of the paste formed was then mixed with 48.7 grams of said urea-formaldehyde, 25 grams of an alkyl vehicle and 47.3 grams of xylol. This mixture was then rolled in a can for 30 minutes. After rolling, the mixture was allowed to stand for 30 minutes. Glass or plastic panels were dipped into the enamel, air dried and baked for 30 minutes at 150° C. Gloss values of the baked enamel panels were determined with a 20° gloss meter.

Similar baked enamel panels were then prepared using the $TiO_2$ pigment treated according to the instant invention. The gloss values of these baked enamel films were then determined and compared with the gloss values of the standard film, the comparisons being expressed in percent increase in gloss values over the gloss value of the standard film.

In order to further illustrate the instant invention the following examples are presented:

EXAMPLE 1

A wet milled titanium dioxide pigment containing an aluminum hydrous oxide coating which had been washed with water to remove the soluble salts, was filtered and dried.

1.25 grams (0.5%) of benzoic acid and 1.25 grams (0.5%) of benzylamine were mixed with 10 grams of acetone. The mixture was then blended in a mixer with 250 grams of the dried pigment. After air drying, the treated pigment was milled and gloss determination was made on the finished pigment using the method described above.

The gloss value of the treated pigment was 68 while an untreated pigment run as a control had a gloss value of 46. The results obtained on the treated pigment represents a 48% increase in gloss over that obtained on the untreated pigment.

EXAMPLES 2–5

The procedure of Example 1 was repeated except that the amounts of benzoic acid and benzylamine employed were varied from 0.3% to 1.5% for each reagent. The results obtained and the operational data are recorded in the following table along with those of Example 1. In all cases the treated pigments showed an increase in gloss over the untreated control pigment.

EXAMPLES 6–8

The procedure of Example 1 was repeated except that para-aminobenzoic acid was used in place of benzoic acid. The amounts of para-aminobenzoic acid and benzylamine were varied from 0.3% to 1.0% for both reagents. The results are recorded in the following table. Again an increase in gloss was obtained over the untreated pigment.

EXAMPLES 9–11

Repeating the procedure of Example 1 except replacing the benzylamine with triethanolamine, a series of runs was made varying the amounts of reagents used from 0.3% to 1.0%. In each case an increase in gloss was obtained.

EXAMPLES 12–17

A series of pigment samples was treated with benzoic acid and amines other than benzylamine and triethanolamine using the procedure described in Example 1. In all cases the gloss values showed an increase over that obtained with an untreated pigment. The operating data and the results obtained are recorded in the following table.

Table

| Example No. | Agent used | Percent increase in gloss |
|---|---|---|
| 1 | 0.5% benzoic acid+0.5% benzylamine | 48 |
| 2 | 0.3% benzoic acid+0.3% benzylamine | 41 |
| 3 | 0.75% benzoic acid+0.75% benzylamine | 37 |
| 4 | 1.0% benzoic acid+1.0% benzylamine | 41 |
| 5 | 1.5% benzoic acid+1.5% benzylamine | 46 |
| 6 | 0.3% para-aminobenzoic acid+0.3% benzylamine | 39 |
| 7 | 0.5% para-aminobenzoic acid+0.5% benzylamine | 39 |
| 8 | 1.0% para-aminobenzoic acid+1.0% benzylamine | 26 |
| 9 | 0.3% benzoic acid+0.3% triethanolamine | 52 |
| 10 | 0.5% benzoic acid+0.5% triethanolamine | 42 |
| 11 | 1.0% benzoic acid+1.0% triethanolamine | 52 |
| 12 | 0.5% benzoic acid+0.25% ethanolamine | 23 |
| 13 | 0.5% benzoic acid+0.4% diethanolamine | 20 |
| 14 | 0.5% benzoic acid+0.3% monoisopropanolamine | 21 |
| 15 | 0.3% benzoic acid+0.3% dipropylamine | 16 |
| 16 | 0.5% benzoic acid+0.2% ethylenediamine | 15 |
| 17 | 0.5% benzoic acid+0.5% cyclohexylamine | 16 |

From the above description and by the examples presented it has clearly been shown that the gloss properties of the titanium dioxide pigment may be improved by treating a titanium dioxide pigment, which has been wet-milled and alumina coated, with a small amount of benzoic or para-aminobenzoic acid and an amine. Using such a treatment, the gloss values of the treated pigment have been increased considerably (15%–52%) over the gloss values of an untreated pigment. Although the particular metal hydrous oxide coating on the $TiO_2$ pigment used to illustrate the invention is alumina it will be understood that equally good gloss values are obtained using a $TiO_2$ pigment coated with other hydrous metal oxides such as silica, titania, zirconia or mixtures thereof. The treatment of the instant invention is simple and economical to employ.

While this invention has been described and illustrated by the examples shown, it is not intended to be strictly limited thereof, and other variations and modifications may be employed within the scope of the following claims.

I claim:

1. Process for the production of titanium dioxide pigment having improved gloss characteristics which comprises adding to a wet milled, hydrous metal oxide coated titanium dioxide pigment from 0.1% to 2.0% of an acid selected from the group consisting of benzoic acid and para-aminobenzoic acid and from 0.1% to 2.0% of an amine selected from the group consisting of benzylamine, ethanolamine, diethanolamine, triethanolamine, dipropylamine, monoisopropanolamine, ethylenediamine and cyclohexylamine, the percentages being weight percentages based on the weight of the titanium dioxide pigment, and without removing said acid and said amine, milling said pigment.

2. Process according to claim 1 in which the metal hydrous oxide is alumina.

3. Process according to claim 1 in which the added acid is benzoic acid and the amine is triethanolamine.

4. Process according to claim 1 in which the added acid is para-aminobenzoic acid.

5. Process according to claim 1 in which the added amine is benzylamine.

6. Process according to claim 1 in which the added amine is ethanolamine.

7. Process according to claim 1 in which the added amine is monoisopropanolamine.

References Cited in the file of this patent

UNITED STATES PATENTS

| 2,591,988 | Wilcox | Apr. 8, 1952 |
| 2,671,031 | Whately | Mar. 2, 1954 |
| 2,819,174 | Vartanian | Jan. 7, 1958 |
| 3,015,573 | Myers et al. | Jan. 2, 1962 |